(12) United States Patent
Arvidsson

(10) Patent No.: US 8,685,137 B2
(45) Date of Patent: Apr. 1, 2014

(54) RECYCLING OF TUNGSTEN CARBIDES

(75) Inventor: Johan Arvidsson, Nyhamnslage (SE)

(73) Assignee: Minpro Aktiebolag, Strassa (SE)

( * ) Notice: Subject to any disclaimer, the term of this patent is extended or adjusted under 35 U.S.C. 154(b) by 0 days.

(21) Appl. No.: 13/500,313

(22) PCT Filed: Oct. 26, 2010

(86) PCT No.: PCT/SE2010/051155
§ 371 (c)(1),
(2), (4) Date: Jun. 15, 2012

(87) PCT Pub. No.: WO2011/053231
PCT Pub. Date: May 5, 2011

(65) Prior Publication Data
US 2012/0251380 A1 Oct. 4, 2012

(30) Foreign Application Priority Data

Oct. 26, 2009 (SE) .................................... 0950795
Jan. 25, 2010 (SE) .................................... 1050077

(51) Int. Cl.
*C22B 34/00* (2006.01)

(52) U.S. Cl.
USPC .............................................. 75/623; 75/351

(58) Field of Classification Search
USPC ................................................ 75/623, 351
See application file for complete search history.

(56) References Cited

U.S. PATENT DOCUMENTS

| 4,113,479 A | * | 9/1978 | Buker ............................. 75/623 |
| 4,533,527 A | * | 8/1985 | Farrell et al. .................... 423/53 |
| 5,527,376 A | | 6/1996 | Amick et al. |

FOREIGN PATENT DOCUMENTS

| GB | 1547139 A | 6/1979 |
| GB | 1559234 A | 1/1980 |
| JP | 2000204404 A | 6/2000 |
| WO | 2008091210 A1 | 7/2008 |

OTHER PUBLICATIONS

European Search Report mailed May 12, 2012.
Proceedings NS-EWM 1996 NML Jamshedpur, pp. 94-98 National Metallurgical Laboratory, Jamshedpur, 831 007 India.
Communication issued in corresponding EP patent application No. 10 827 239.4-1362, issued Mar. 15, 2013.
International Search Report and Written Opinion (mailed Feb. 23, 2011).

* cited by examiner

*Primary Examiner* — Weiping Zhu
(74) *Attorney, Agent, or Firm* — Jeffrey S. Melcher; Manelli Selter PLLC

(57) ABSTRACT

The invention relates to a process for producing an iron-and/or tungsten containing powder or powder agglomerate including the steps of: a) mixing at least a first powder fraction comprising a tungsten carbide containing powder, and at least a second powder fraction comprising an iron oxide powder and/or a tungsten oxide containing powder and optionally an iron powder, the weight of the first fraction being in the range of 50-90% by weight of the mix and the weight of the second fraction being in the range of 10-50% by weight of the mix, b) heating the mix of step a) to a temperature in the range of 400-1300° C., preferably 1000-1200° C. The invention also relates to an iron-and/or tungsten containing powder or powder agglomerate.

24 Claims, 1 Drawing Sheet

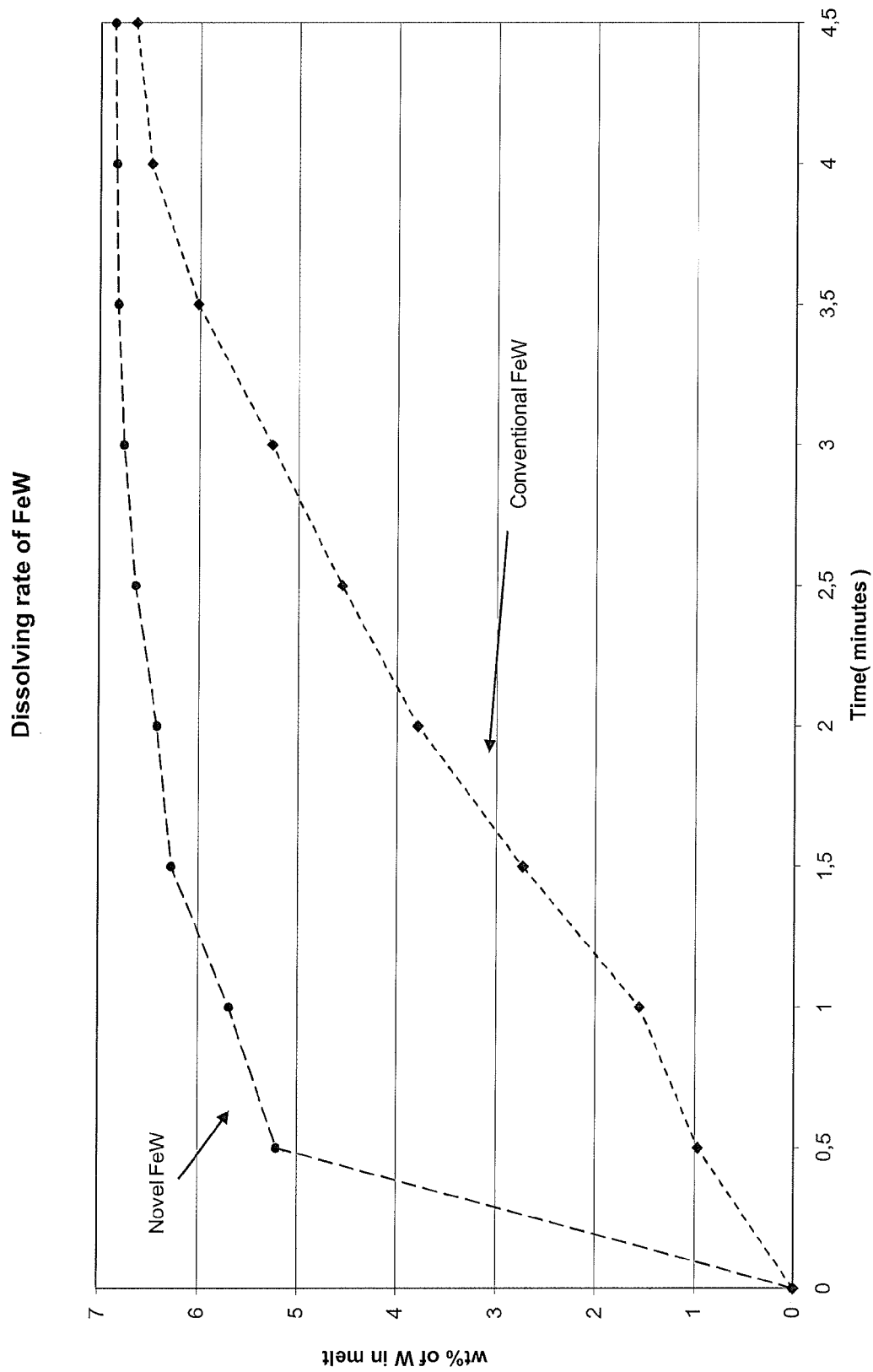

RECYCLING OF TUNGSTEN CARBIDES

CROSS-REFERENCE TO RELATED APPLICATIONS

This application is a national stage entry under 35 U.S.C. 371 of International Application No. PCT/SE2010/051155, filed 26 Oct. 2010, designating the United States. This application claims foreign priority under 35 U.S.C. 119 and 365 to Swedish Patent Application Nos. 0950795-5, filed 26 Oct. 2009, and 1050077-5, filed 25 Jan. 2010. The complete contents of these applications are incorporated herein by reference.

TECHNICAL FIELD

The present invention relates to a process for producing an iron and tungsten containing material, starting from cemented carbide powder, pure WC or Tungsten ore.

BACKGROUND

Cemented tungsten carbide materials is a group of very hard tool materials, often called hardmetals, which are obtained by liquid phase sintering tungsten monocarbide (WC) grains in a binder matrix which conventionally is cobalt or a cobalt rich alloy, although also other cementing or binding materials, such as iron, nickel, chromium, molybdenum and others may be employed. Normally, the content of matrix material amounts to about 3-8 wt-% of the total weight of the cemented carbide material but may be as low as about 1 or as high as up to about 20 wt-%. Recovery of tungsten from scrap from such cemented tungsten carbide tool materials is an important factor in the world's tungsten supply, but also the value of recovered cobalt should be recognized in this connection.

Today tungsten is mainly recovered from scrap cemented tungsten carbide powders by oxidization followed by chemical processing. From this source, other tradable tungsten raw materials can be produced, such as ferrotungsten. Ferrotungsten is mainly used when alloying with tungsten in steel production. It would be desirable if such tungsten carbide scrap could be recycled in a cost efficient manner to an intermediate tradable on the market.

A problem which may arise when alloying with ferrotungsten is that it may concentrate at the bottom of the melt where they may react with the furnace lining, which may affect the concentration of tungsten as well as the homogeneity of it in the melt.

WO2008091210 discloses an iron a tungsten containing powder comprising 30-60 wt % W and balance Iron. The powder is made by mixing an iron powder with a WO3-powder.

OBJECT OF THE INVENTION

It is an object of the invention to recover values from cemented tungsten carbide scrap, and/or pure WC powder and/or tungsten ore in a cost efficient manner.

Another object of the invention is to provide an alloying material that can be used when alloying with tungsten in steel production, and a method for producing the alloying material.

SUMMARY OF THE INVENTION

At least one of the above mentioned objects are solved by a process for producing an iron- and/or tungsten containing powder or powder agglomerate such as a powder cake or pieces from a crushed powder cake, the process including the steps of:

a) mixing at least a first powder fraction comprising a tungsten carbide containing powder, and at least a second powder fraction comprising an iron oxide powder and/or a tungsten oxide containing powder and optionally an iron powder, the weight of the first fraction being in the range of 50-90% by weight of the mix and the weight of the second fraction being in the range of 10-50% by weight of the mix, and b) heating the mix derived from step a) to a temperature in the range of 400-1300° C., preferably 1000-1200° C.

Such iron- and/or tungsten containing powder or powder agglomerate can be used as a substitute for traditionally manufactured ferrotungsten alloys, when alloying with tungsten in steel production. In particular when the tungsten carbide containing powder is provided from tungsten carbide scrap, e.g. cemented carbide scrap, tungsten values therein can be recovered in a cost efficient manner.

Preferably the first powder fraction consists essentially of the tungsten carbide containing powder.

Preferably the second powder fraction consists essentially of the iron oxide powder and/or the tungsten oxide containing powder and optionally iron powder. Thus the iron oxide powder can be partly or alternatively entirely substituted by a tungsten oxide containing powder. However, the second fraction may also essentially consist of an iron oxide powder, i.e. in such an embodiment without a tungsten oxide powder. Preferably the tungsten oxide containing powder, when employed, is an iron and tungsten oxide containing powder, more preferably iron tungstate in the form of the mineral Ferberite. Preferably the iron oxide powder, when employed, is essentially magnetite and/or hematite. Iron powder is not employed in the second fraction without the presence of iron oxide powder and/or tungsten oxide containing powder.

The process described above advantageously provides an iron- and/or tungsten containing powder or powder agglomerate which comprises 50-99% by weight tungsten, 0-50% by weight of iron, 0-10% by weight of cobalt, less than 10% by weight oxygen, less than 1% by weight carbon, and incidental impurities.

According to one embodiment, an iron- and tungsten containing powder or powder agglomerate is suggested, which comprises 60<W≤95% by weight tungsten, less than 10% by weight oxygen, less than 1% by weight carbon, balance iron and incidental impurities. Such powder or powder agglomerate is suitable when alloying with tungsten in steel production, in particular due to its high tungsten content.

According to another embodiment, an iron- and tungsten containing powder or powder agglomerate is suggested, which comprises 50-95% by weight tungsten, 1-10% by weight of cobalt, less than 10% by weight oxygen, less than 1% by weight carbon, balance iron and incidental impurities. Such powder or powder agglomerate can e.g. be used when alloying with tungsten and cobalt in steel production.

In another aspect of the invention an iron- and tungsten containing powder is provided in a casing or container. Such casing or container could e.g. be a hollow tube or wire, or a can. The filled casing or container can be used is steel manufacturing, wherein the filled casing or container or part thereof can be supplied to a molten steel in order to alloy the steel melt with tungsten in a controlled manner.

BRIEF DESCRIPTION OF THE DRAWINGS

FIG. 1 shows the dissolving rate for a commercially available ferrotungsten grade compared to a powder agglomerate of the invention.

DESCRIPTION OF THE INVENTION

The present invention relates to a novel method of producing an iron and/or tungsten containing powder or powder agglomerate such as a powder cake or pieces from a crushed powder cake, which can be used to replace traditional, commercially available ferrotungsten grades. The new method includes the steps of:
  a) mixing at least a first powder fraction comprising a tungsten carbide containing powder, and at least a second powder fraction comprising an iron oxide powder and/or a tungsten oxide containing powder and optionally an iron powder, the weight of the first fraction being in the range of 50-90% by weight of the mix and the weight of the second fraction being in the range of 10-50% by weight of the mix, and
  b) heating the mix derived from step a) to a temperature in the range of 400-1300° C., preferably 1000-1200° C., whereby an iron and tungsten containing powder or powder agglomerate is formed.

In step b) the oxygen from the iron oxide powder and/or tungsten oxide containing powder of the second fraction reacts with the carbon in the tungsten carbide containing powder of the first fraction, forming CO or CO2, while tungsten and iron reacts and forms an iron and/or tungsten containing powder with low, if any, residues of tungsten carbides. The second fraction may contain an iron powder in combination with the oxide carrying powders, i.e. iron oxide powder and/or tungsten oxide containing powder. The iron powder can be used to control the relative amount of iron in the iron and tungsten carbide containing powder. A powder or powder agglomerate essentially void of Fe may be produced if in step a) the second powder fraction is a tungsten oxide containing powder void of Fe, e.g. a WO3-powder.

The heating of step b) is performed during 0.5-10 h, preferably during 0.5-4 hours, more preferably 0.5-3 hours, most preferably 0.5-2 hours. A shorter heating time having the advantage of reducing production costs. The heating could be performed in a batch or continuous furnace.

The atmosphere in step b) is conveniently neutral or weakly reducing; preferably the atmosphere comprises 80-100 vol % $N_2$ and 20-0 vol % $H_2$. However, other atmospheres which are either neutral or weakly reducing can be used as well, including gases from e.g. partially burned natural gas (which may contain one or more of H2, CO, CO2, H2O, N2 and or others) etc.

In one embodiment the mix of step a) the first fraction essentially consist of a tungsten carbide containing powder and the second fraction essentially consist of an iron oxide powder, in such relative amounts that the mixture of step a) comprises 60-90 wt % tungsten carbide containing powder, and 40-10 wt % iron oxide powder, preferably 70-80 wt % tungsten carbide containing powder and 30-20 wt % iron oxide powder. The iron oxide powder can be a hematite ($Fe_2O_3$) powder or magnetite ($Fe_3O_4$) powder, or a mix thereof.

When the iron oxide powder is hematite, the reaction with the tungsten carbide containing powder will basically be:

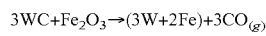

When the iron oxide powder is magnetite, the reaction with the tungsten carbide containing powder will basically be:

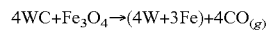

In another embodiment, the iron oxide powder is partially or entirely substituted by a tungsten oxide containing powder, preferably a Ferberite ($FeWO_4$) powder. The reaction with the tungsten carbide containing powder will then basically be:

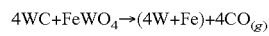

If the tungsten carbide containing powder includes cobalt, and/or other matrix metal, the material can be removed prior to the mixing step a). At least in the case of cobalt, the matrix metal removed through leaching prior to the mixing of step a) if it is desired that the iron- and tungsten containing powder or powder agglomerate should be essentially free of cobalt and/or other matrix metal. Alternatively, an iron- and tungsten containing powder or powder agglomerate including cobalt and/or other matrix metal in controlled amounts can be produced.

In case of cobalt leaching, the process may further include one or more of the following steps:
  c), leaching cobalt and/or other matrix metal from the tungsten carbide containing powder prior to mixing in step a) by using a leaching agent, so that the Co content and/or other matrix metal in the tungsten carbide containing powder is brought of be less than 1 wt %, preferably less than 0.5 wt % more preferably less than 0.2 wt %.
  d), subsequent to step c) but prior to mixing in step a), separating the tungsten carbide containing powder from the leaching agent containing the leached cobalt and/or other matrix metal.
  e), subsequent to step d) but prior to mixing step a), washing the tungsten carbide containing powder in an aqueous medium.

In one embodiment the mixing of step a) is performed in a wet condition, preferably while the powders are contained in an aqueous medium. This is in particular suitable if the tungsten carbide containing powder has been leached to remove cobalt and/or other matrix metal, i.e. removing the need to dry the leached powder before mixing. Another advantage is that mixing while in an aqueous medium makes it easier to achieve a uniform mix. Preferably, after mixing in wet condition but before heating the mix according to step b), the process includes a step f): filtrating the mixed powders to reduce the content of the aqueous medium and form a filter cake of the mixed powders. Thereby, when heating in step b) the powders in the mix will at least partly sinter together thereby forming powder cake (powder agglomerate), which can be crushed and/or grinded into larger pieces or finer pieces depending on which preferred application. Since the particles are only loosely sintered this can be easily done. For instance pieces of loosely sintered particles having average diameters in the range of 10-50 mm can be employed when alloying with in steel melts, while in other applications it can be desired to grind the powder agglomerate to a finer powder.

In step f) the filtration can be done using a press filter, whereby the porosity of the powder cake can be varied, i.e. thereby controlling the density of the powder cake (powder agglomerate).

Tungsten Carbide Containing Powder

The tungsten carbide containing powder provided as a first powder fraction in step a) is a powder that comprises tungsten carbides which may be contained in a metal matrix. Preferably the tungsten carbide containing powder is obtained from tungsten cemented carbide scrap. Preferably, the tungsten carbide containing powder comprises 1-10% by weight of carbon, balance tungsten and incidental impurities. The tungsten carbide containing powder may also comprise alloy elements which have formed a matrix (binding material) for the cemented tungsten carbide material. The proportion of carbide phase is generally between 70-97% of the total weight of the composite. The carbon is present in the powder particles in the form of tungsten carbide grains, and typically the grain size averages between 0.10 μm and 15 μm. Any powder particle may include several tungsten carbide grains, in particular if the particle sizes are large. Further, the tungsten carbide containing powder may include powder particles that are void of any tungsten carbide grains; however most of the powder particles will include one or more grains of tungsten carbide.

In some applications it is desired to have cobalt in the iron and tungsten containing powder in amounts of 1-10 wt %, preferably 3-8 wt %. Therefore, for such applications, the tungsten carbide containing powder can be allowed to include cobalt. This can for instance be economically interesting since many of the tungsten carbide containing powders from scrap that are available on the market comprises Cobalt in amounts of 1-10 wt % Co, usually in amounts of 3-8 wt % Co. For instance, the tool material in circuit board drills typically comprises fine grained, cemented tungsten carbides existing in a cobalt matrix, the amount of which represents 6 percent of the total weight of the tool material, while coarse grain tungsten carbide materials typically are used for the tool material of mine drills, where the cobalt content of the cemented carbide material is about 10 weight percent. In one embodiment, the tungsten carbide containing powder is a straight grade tungsten carbide powder that contains WC and Co and only a few trace elements.

Alternatively, if low cobalt content is desired, a tungsten containing powder that has a low amount of cobalt, or which is void of cobalt, can be used, i.e. preferably less than 1 wt % Co, more preferably less than 0.5 wt % Co, even more preferably less than 0.2 wt % Co.

Alternatively, commercially available tungsten carbide containing powders from scrap that comprises 1-10 wt % Co, usually in amounts of 3-8 wt % Co, can be hydrometallurgical leached to reduce the cobalt content to be less than 1 wt % Co, preferably less than 0.5 wt % Co, more preferably less than 0.2 wt % Co. The cobalt from the leaching process can be recycled and employed as a commercial product per se.

According to one embodiment, the tungsten carbide containing powder used to produce the iron- and tungsten containing powder is a very fine powder wherein at least 80% by weight of the particles, preferably at least 90 wt %, have a particle size in the range of 0.1-20 μm, preferably 0.1-12 μm.

According to another embodiment the tungsten carbide containing powder used to produce the iron- and tungsten containing powder is a coarser powder wherein at least 80% by weight of the particles, preferably at least 90 wt %, have a particle size in the range of 20-150 μm, preferably 20-100 μm.

Iron Oxide Powder

The iron oxide powder preferably mainly consists of hematite ($Fe_2O_3$) powder or magnetite ($Fe_3O_4$) powder or a mix of hematite and magnetite powders.

According to one embodiment, the iron oxide powder comprises at least 60 wt % $Fe_3O_4$, preferably at least 80 wt %, more preferably at least 90 wt %, most preferably at least 99 wt %. Preferably, the balance is other iron oxides, more preferably mainly $Fe_2O_3$, and incidental impurities.

According to another embodiment, the iron oxide powder comprises at least 60 wt % $Fe_2O_3$, preferably at least 80 wt %, more preferably at least 90 wt %, most preferably at least 99 wt %. Preferably, the balance is other iron oxides, more preferably mainly $Fe_3O_4$, and incidental impurities.

Preferably, at least 80% by weight of the particles of the iron oxide powder, more preferably at least 90 wt %, have a particle size in the range of 1-100 μm, preferably 1-20 μm.

Tungsten Oxide Containing Powder

In one embodiment the tungsten oxide containing powder is an iron and tungsten oxide containing powder, more preferably iron tungstate in the form of the mineral Ferberite. Ferberite can be milled so that at least 80% by weight of the particles, preferably at least 90 wt %, have a particle size in the range of 1-150 μm, preferably 1-100 μm.

By partly or wholly substituting the iron oxide powder by a Ferberite powder, when mixing with the tungsten carbide containing powder in step a), the tungsten content can be correspondingly increased in the iron and tungsten containing powder.

In an alternative embodiment, the tungsten oxide containing powder is a WO3-powder or a mix of an iron tungstate powder and a WO3-powder. If the first fraction consists of a WC powder and the second fraction consists of a WO3 powder, a more or less pure tungsten powder can be produced.

Iron Powder

Optionally the second fraction can contain a non oxidized iron powder in combination with an oxide carrying material (i.e. tungsten oxide containing powder and/or iron oxide powder). Thereby the relative amount of iron in the iron and tungsten containing powder can be controlled.

Preferably, at least 80% by weight of the particles of the iron powder, more preferably at least 90 wt %, have a particle size in the range of 1-100 μm, preferably 1-20 μm.

Iron and/or Tungsten Containing Powder or Powder Agglomerate

The iron and/or tungsten containing powder or powder agglomerate which can be produced according to the method comprises, according to one aspect of the invention: 50-99 wt % W, 0-50 wt % Fe, 0-10 wt % Co, less than 10 wt % 0, less than 1 wt % C, and incidental impurities. A powder or powder agglomerate essentially void of Fe may be produced if in step a) the second powder fraction is a tungsten oxide containing powder void of Fe, e.g. a WO3-powder. However, preferably the iron and/or tungsten containing powder or powder agglomerate is an iron and tungsten containing powder or powder agglomerate having a significant amount of iron, preferably at least 5 wt % Fe.

In some applications it is desired to have cobalt in the iron and/or tungsten containing powder or powder agglomerate in amounts of 1-10 wt %, preferably 3-8 wt %. However in other applications cobalt is not desirable and for such applications the content of Co should be less than 1 wt %, preferably less than 0.2 wt %.

Regarding the presence of oxygen it should be less than 10 wt % as stated above. Preferably the content of O is less than 5 wt %, more preferably less than 3 wt %, and even more preferably less than 2 wt %, most preferably less than 1 wt %.

Regarding the presence of carbon it should be less than 1 wt % as stated above. Preferably the content of C is less than 0.5 wt %, more preferably less than 0.3 wt %, and most preferably less than 0.1 wt %.

Regarding the content of tungsten, the content is preferably $60 < W \leq 95\%$ by weight. More preferably the content of W is in the range of 65-90 wt %, most preferably the content of W is in the range of 70-90 wt %.

The powder and/or powder agglomerate from step b) may additionally be crushed and/or grinded to reduce average sizes.

According to one embodiment of the invention, the iron and tungsten containing powder or powder agglomerate, is a very fine powder wherein at least 80% by weight of the particles, preferably at least 90 wt %, have a particle size in the range of 0.1-25 μm, preferably 0.1-15 μm. Preferably the apparent density of the powder is below 6 g/cm3, more preferably below 5 g/cm3, most preferably in the range of 2-4 g/cm3. Such a powder could e.g. be used in traditional press and sinter technology but could also be employed in MIM technology According to another embodiment the iron- and tungsten containing powder or powder agglomerate is a coarser powder wherein at least 80% by weight of the particles, preferably at least 90 wt %, have a particle size in the range of 25-170 μm, preferably 25-120 μm. Preferably the apparent density of the powder is below 6 g/cm3, more preferably below 5 g/cm3, most preferably in the range of 2-4 g/cm3. cm3. Such a powder could e.g. be used in traditional press and sinter technology.

The finer or coarser powder could also be provided in a casing or container. Such casing or container could e.g. be a hollow tube or wire, or a can. The filled casing or container can be used is steel manufacturing, wherein the filled casing or container or part thereof can be supplied to a molten steel in order to alloy the steel melt with tungsten in a controlled manner.

According to yet another embodiment the iron- and tungsten containing powder or powder agglomerate is proceed in the form of a powder cake. The powder cake may be crushed or grinded into larger or smaller pieces down to sizes of a powder—the sizes depending on the application. The density of the powder cake depends on the actual composition but also on how much it is pressed during the filtration, as well as the heating temperature and the heating duration of step b). Thus the porosity of the powder cake can be varied, and hence the density of the powder cake can be made considerably lower than that of traditional available ferrotungsten, which typically have densities around 15-16 g/cm3. When alloying in steel melts the applicant has found out that a density, of the powder cake and/or crushed pieces of the powder cake preferably is below 12 g/cm3, more preferably below 10 g/cm3, and most preferably in the range of 6-9 g/cm3. When alloying in steel melts the powder cake is preferably crushed into pieces, so that at least 80% by weight of the pieces have an average diameters in the range of 5-100 mm, more preferably in the range of 10-50 mm, most preferably in the range of 20-40 mm. Due to their comparably low density the pieces will sink slowly through the melt and they will gradually dissolve in the steel melt in a similar fashion as a sugar cube does in a tea cup, since the crushed pieces consists of agglomerates of powder particles. Thereby most if not all is fully dissolved before reaching the bottom of the melt, and hence it will be easier to control the concentration of tungsten as well as the homogeneity of it in the melt. Thus this kind of material has an enhanced dissolving rate than traditional ferrotungsten.

EXAMPLE 1

FIG. 1 shows the dissolving rate for a traditional and commercially available ferrotungsten grade (e.g. according to standards ISO5450) compared to an iron and tungsten containing powder agglomerate of the invention, i.e. a novel ferrotungsten grade. A mixture was prepared by mixing 25% by weight of a Magnetite powder (Fe3O4) from the company Minelco AB (www.minelco.com) with 75% by weight of a tungsten carbide containing powder. The tungsten carbide containing powder having the composition: 98 wt % WC, 0.7 wt % Co, and trace elements. The particle sizes for both powders were less than 20 um. The mixture was heat treated in a batch furnace at a temperature of 1100° C. for a time period of 6 hours, in a weakly reducing atmosphere. The resulting iron and tungsten containing agglomerate in the form of a powder cake had the following composition: 75 wt % W, 23 wt % Fe, 1 wt % O, 0.5 wt % Co, 0.5 wt % C, and trace elements. The powder cake was crushed into pieces having average sizes of 1-5 cm in diameter, each piece comprising small powder particles loosely sintered together, i.e. providing a novel ferrotungsten grade. The density of each piece was in the range 7-9 g/cm3.

The aim with the experiment was to evaluate if the sintered structure of the iron and tungsten powder agglomerate had a faster dissolving rate than traditional and commercially available ferrotungsten grade.

Another advantage with the sintered structure is that "sinkers" can be avoided due to the lower sinking speed, i.e. pieces that sinks to the bottom of the melt and reacts with the furnace lining.

Two steel melts, a first and a second, were prepared and their compositions were analyzed. The first comprising: 4.3 wt % Cr, 6.1 wt % Mo, 3.1 wt % V, 0.2 wt Si, 0.1 Ni, 1.5 wt % C, balance Fe and total amount of trace elements less than 0.5 wt %. Content of W was 0 wt %. The second comprising: 4.3 wt % Cr, 6.1 wt % Mo, 3.3 wt % V, 0.2 wt Si, 0.1 Ni, 0.1 wt % W, 1.6 wt % C, balance Fe and total amount of trace elements less than 0.5 wt %. Both steel melts were held at a temperature around 1550° C. To the first melt W was added in form of prepared the iron and tungsten containing agglomerate (crushed pieces of the powder cake), i.e. the novel ferrotungsten grade, and to the second melt a traditional ferrotungsten grade was added. The traditional commercially available ferrotungsten grade had a composition including 76 wt % W, balance Fe and the density was measured to 15.4 g/cm3. Both for the traditional and the novel ferrotungsten all content was added in one batch. Thereafter a sample was taken every 30 second to measure the W-content. Ten samples were taken for each melt, and FIG. 1 shows how the content of W changes over time for each melt. As can be seen the content of W rises much quicker for the novel ferrotungsten than for the traditional ferrotungsten, i.e. the dissolving rate for the novel ferrotungsten is higher than for traditional ferrotungsten.

EXAMPLE 2

TABLE 1

| Powder | Weight [g] | %-by weight of mixture | Particle size [μm] |
|---|---|---|---|
| WO3 (WO3 > 99.5%) | 55.4 | 23.3 | <45 |
| WC (WC > 98%) | 142.6 | 60 | <20 |
| Fe (Fe > 99%) | 39.7 | 16.7 | <70 |

A WO3 powder, a WC powder and a Fe powder were mixed in amounts as shown in Table 1. The WC powder having the composition: 98 wt % WC, 0.7 wt % Co, and trace elements. The mixture was heated in a crucible at a temperature of 1050 C for 4 hours. The atmosphere was contained 95 vol-% N2 and 5 vol-% H2. The mixture was cooled down to room temperature. The result was a loosely packed agglomerate of powder containing iron and tungsten. The content of carbon and oxygen in the powder agglomerate were analyzed and showed a content of 0.01 wt % C and 0.7 wt % 0.

EXAMPLE 3

TABLE 1

| Powder | Weight [g] | %-by weight of mixture | Particle size [µm] |
|---|---|---|---|
| Ferberite (~73% WO3) | 76.2 | 31.9 | <100 |
| WC (WC > 99.5%) | 142.8 | 59.8 | <20 |
| Fe (Fe > 99%) | 19.8 | 8.3 | <70 |

A WO3 powder, a WC powder and a Fe powder were mixed in amounts as shown in Table 2. The mixture was heated in a crucible at a temperature of 1050 C for 4 hours. The atmosphere was contained 95 vol-% N2 and 5 vol-% H2. The mixture was cooled down to room temperature. The result was a loosely packed agglomerate of powder containing iron and tungsten. The content of carbon and oxygen in the powder agglomerate were analyzed and showed a content of 0.08 wt % C and 2.0 wt % O.

The invention claimed is:

1. Process for producing an iron- and/or tungsten containing powder or powder agglomerate such as a powder cake, the process including the steps of:
   a) mixing at least a first powder fraction comprising a tungsten carbide containing powder, and at least a second powder fraction comprising an iron oxide powder and/or a tungsten oxide containing powder, the weight of the first fraction being in the range of 50-90% by weight of the mix and the weight of the second fraction being in the range of 10-50% by weight of the mix; and
   b) heating the mix derived from step a) to a temperature in the range of 400-1300° C.

2. The process according to claim 1, wherein in step (b) the mix is heated to a temperature in the range of 1000-1200° C.

3. The process according to claim 1, wherein the second powder fraction further comprises an iron powder.

4. The process according to claim 1, wherein the atmosphere in step b) is neutral or weakly reducing.

5. The process according to claim 1, wherein the atmosphere in step b) comprises 80-100 vol % $N_2$ and 20-0 vol % $H_2$.

6. The process according to claim 1, wherein heating in step b) is performed during 0.5-10 hours.

7. The process according to claim 1, wherein heating in step b) is performed during 0.5-2 hours.

8. The process according to claim 1, wherein the iron oxide powder includes at least 60 wt % $Fe_3O_4$ powder, preferably at least 99 wt % $Fe_3O_4$ powder.

9. The process according to claim 1, wherein the iron oxide powder includes at least 99 wt % $Fe_3O_4$ powder.

10. The process according to claim 1, wherein the iron oxide powder includes at least 60 wt % $Fe_2O_3$ powder.

11. The process according to claim 1, wherein the iron oxide powder includes at least 99 wt % $Fe_2O_3$ powder.

12. The process according to claim 1, wherein the tungsten carbide containing powder comprises in weight-%:
   1-10 C;
   balance tungsten and incidental impurities.

13. The process according to claim 1, wherein in step a) the first fraction essentially consist of a tungsten carbide containing powder and the second fraction essentially consist of an iron oxide powder, in such relative amounts that the mixture of step a) comprises 60-90 wt % tungsten carbide containing powder, and 40-10 wt % iron oxide powder.

14. The process according to claim 1, wherein in step a) the first fraction essentially consist of a tungsten carbide containing powder and the second fraction essentially consist of an iron oxide powder, in such relative amounts that the mixture of step a) comprises 70-80 wt % tungsten carbide containing powder and 30-20 wt % iron oxide powder.

15. The process according to claim 1, wherein in step a) the tungsten oxide containing powder is a Ferberite powder.

16. The process according to claim 1, wherein in step a) the tungsten carbide containing powder further comprises 1-10 wt % Co.

17. The process according to claim 1, wherein in step a) the tungsten carbide containing powder further comprises 3-8 wt % Co.

18. The process according to claim 1, wherein the process further includes a step c) in which cobalt is leached from the tungsten carbide containing powder prior to mixing in step a) by using a leaching agent, so that the Co content in the tungsten carbide containing powder is reduced to be less than 1 wt %.

19. The process according to claim 18, wherein the process further includes a step d) subsequent to said step c) but prior to mixing in step a), in which step d) the tungsten carbide containing powder is separated from the leaching agent containing the leached cobalt.

20. The process according to claim 19, wherein the process further includes a step e) subsequent to step d) but prior to mixing step a) in which step e) washing the tungsten carbide containing powder in an aqueous medium.

21. The process according to claim 1, wherein the process further includes a step c) in which cobalt is leached from the tungsten carbide containing powder prior to mixing in step a) by using a leaching agent, so that the Co content in the tungsten carbide containing powder is reduced to be less than 0.2 wt %.

22. The process according to claim 1, wherein the mixing of step a) is performed in a wet condition.

23. The process according to claim 1, wherein the mixing of step a) is performed while the powders are contained in an aqueous medium.

24. The process according to claim 20, wherein the process further includes a step f) subsequent to step a) but prior to step b), in which step f) subjecting the mix of step a) to filtration to at least partly remove the aqueous medium forming a filter cake of the mixed powders.

* * * * *